United States Patent [19]

Cadars

[11] 4,432,410

[45] Feb. 21, 1984

[54] HEAT EXCHANGER, IN PARTICULAR FOR A COOLING CIRCUIT OF A MOTOR VEHICLE ENGINE

[75] Inventor: Patrick Cadars, Montigny le Bretonneux, France

[73] Assignee: Valeo, Paris, France

[21] Appl. No.: 260,672

[22] Filed: May 5, 1981

[30] Foreign Application Priority Data

May 5, 1980 [FR] France .................... 80 09989

[51] Int. Cl.³ ................................ B05D 23/00
[52] U.S. Cl. ........................ 165/32; 165/35; 236/34.5; 123/41.1
[58] Field of Search ............. 165/32, 35; 123/41.1, 123/41.08, 41.51, 41.09; 236/34.5

[56] References Cited

U.S. PATENT DOCUMENTS

| | | |
|---|---|---|
| 1,438,067 | 12/1922 | Springer . |
| 1,874,104 | 8/1932 | Johnson . |
| 2,052,313 | 8/1936 | Payne . |
| 2,065,148 | 12/1936 | Nallinger ................ 123/41.1 |
| 2,500,472 | 3/1950 | Sohler . |

FOREIGN PATENT DOCUMENTS

| | | |
|---|---|---|
| 419023 | 7/1922 | Fed. Rep. of Germany ..... 123/41.1 |
| 1476376 | 6/1969 | Fed. Rep. of Germany . |
| 581617 | 5/1924 | France . |
| 2411964 | 12/1978 | France . |
| 490631 | 2/1954 | Italy ............................. 165/35 |
| 55-22504 | 2/1980 | Japan ........................... 165/35 |

Primary Examiner—William R. Cline
Assistant Examiner—S. Gayle Dotson
Attorney, Agent, or Firm—Jacobi, Siegel, Presta, Marzullo & Aronson

[57] ABSTRACT

A heat exchanger for an engine cooling circuit, comprising first and second liquid circuits formed in parallel in the exchanger, and a temperature sensitive valve for controlling the flow of liquid through said circuits, wherein passages formed between both circuits are adapted to be closed and opened by a single sealing member on which act the said valve and a return spring.

8 Claims, 24 Drawing Figures

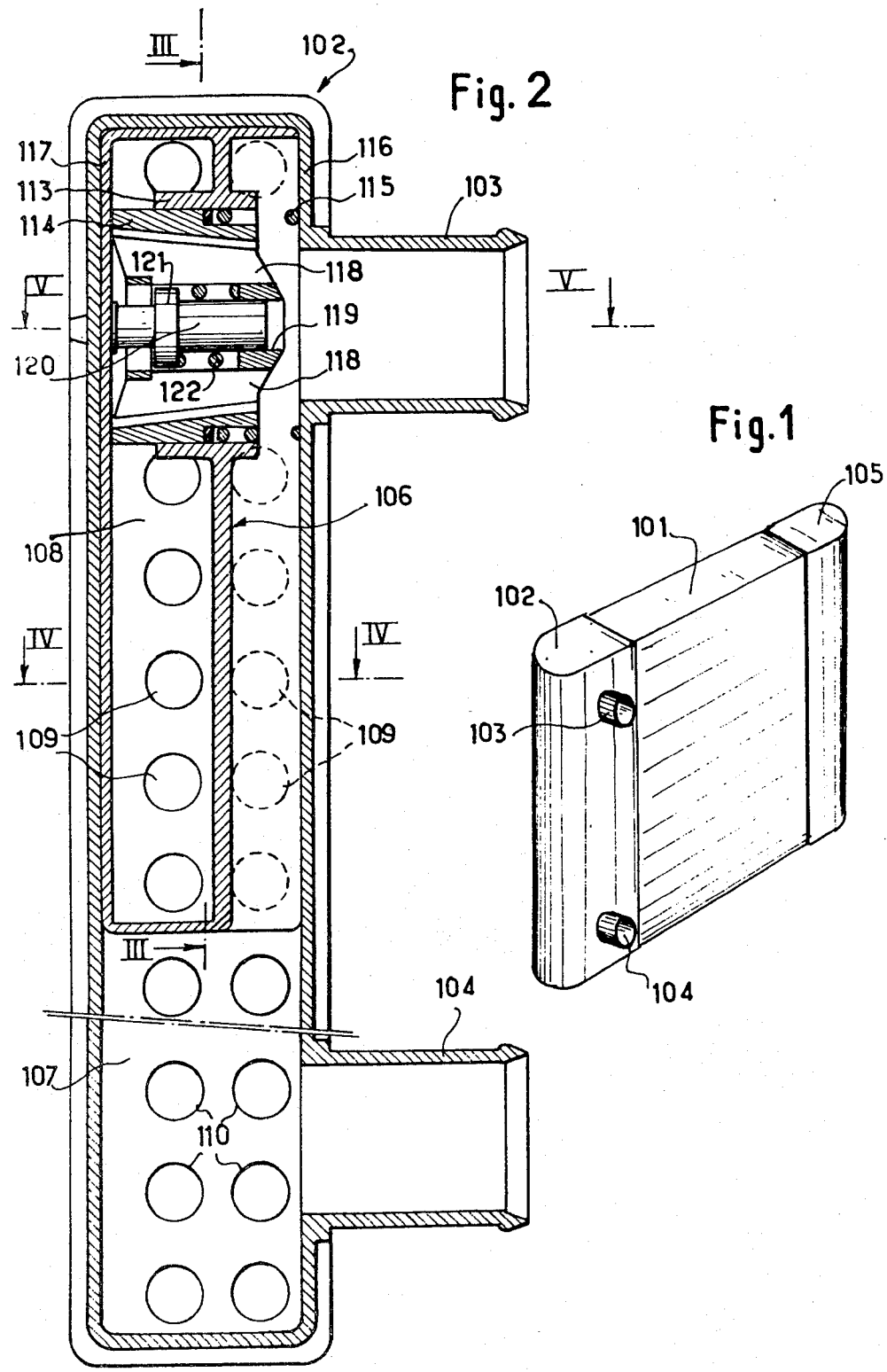

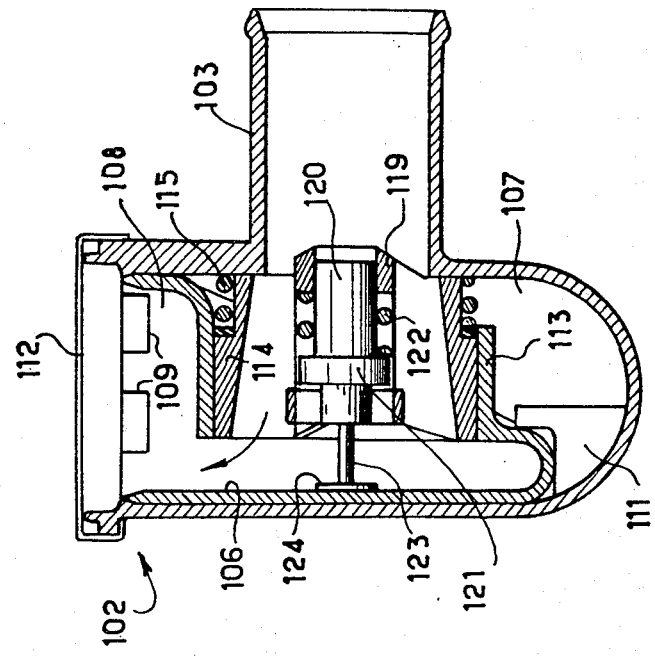
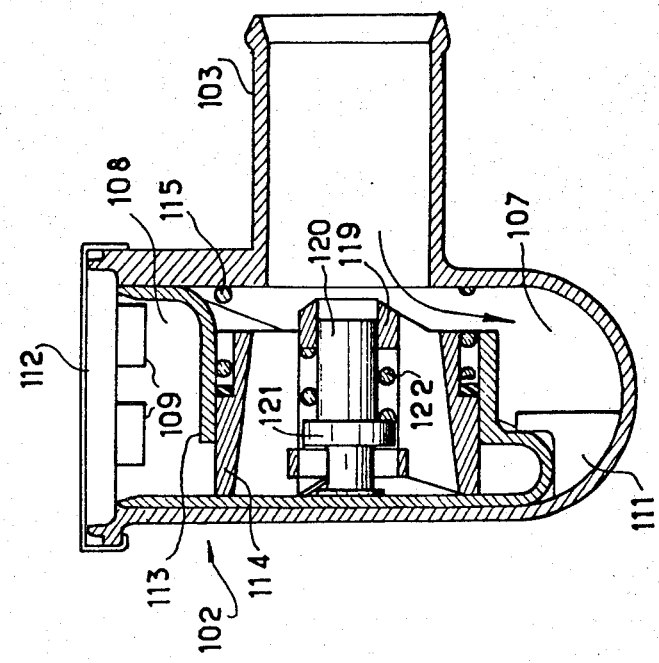

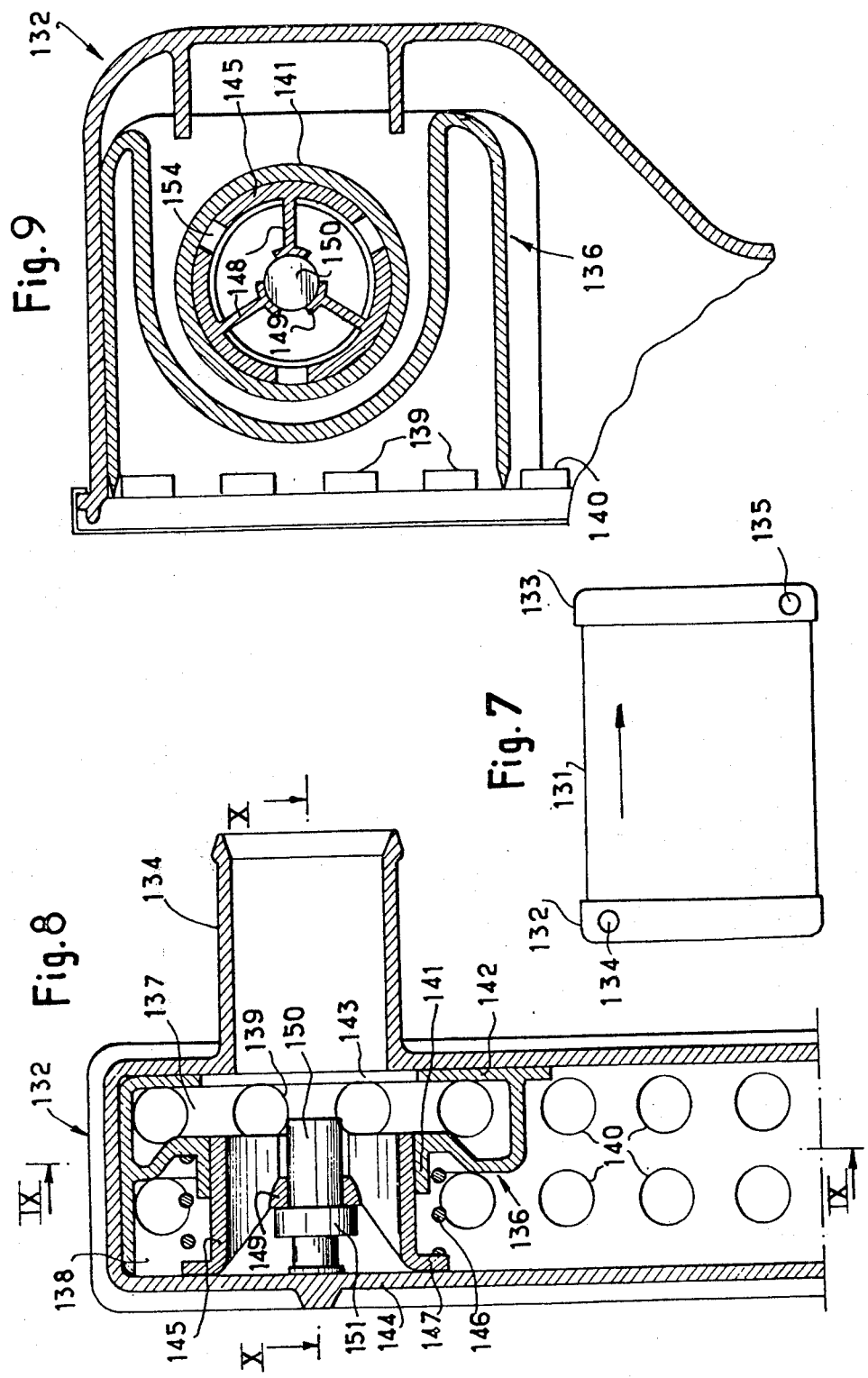

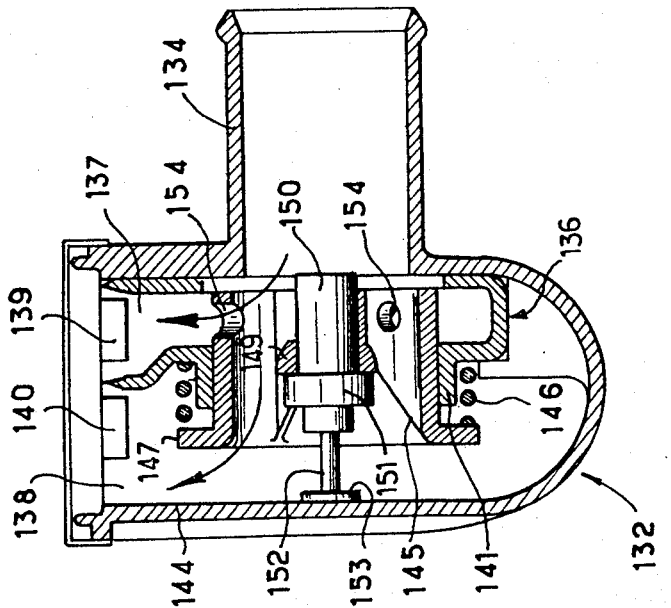
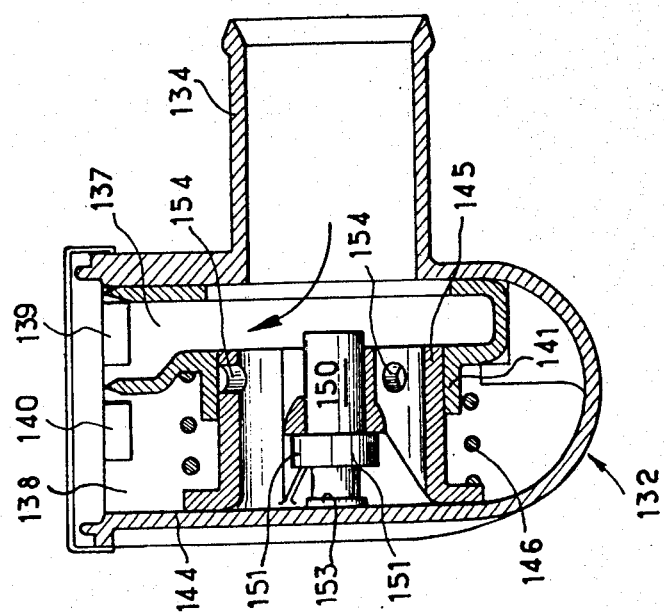

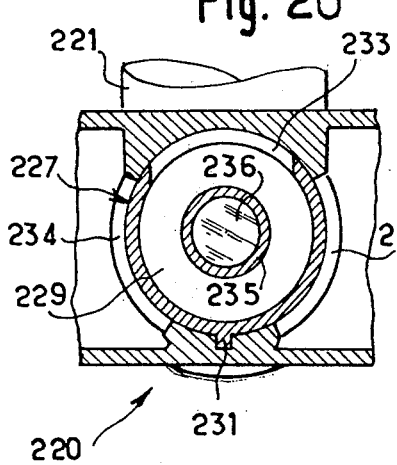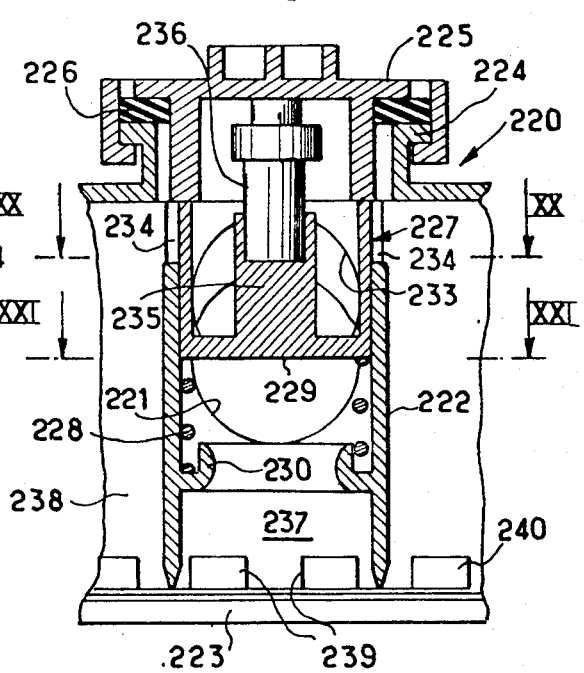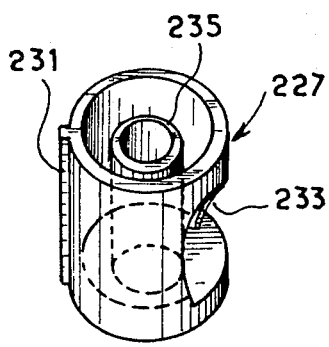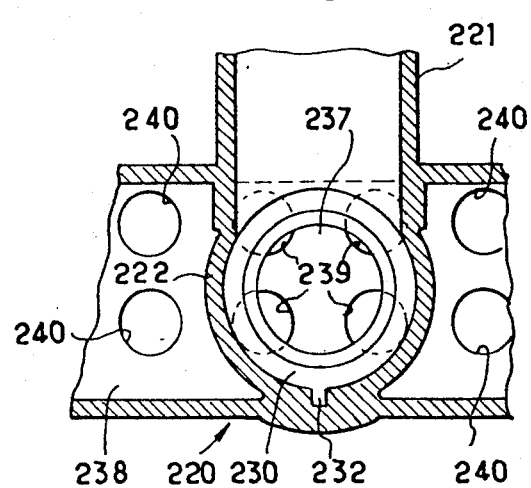

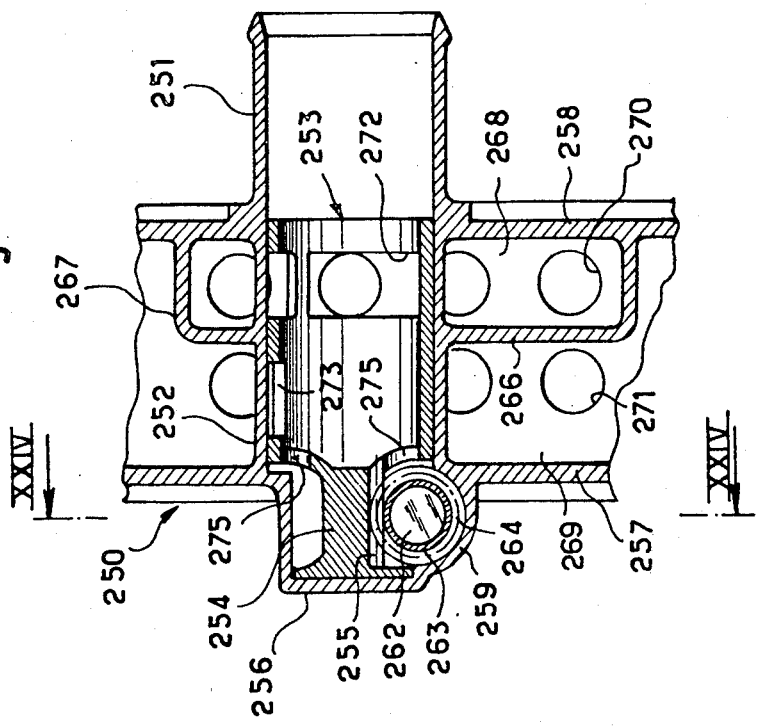
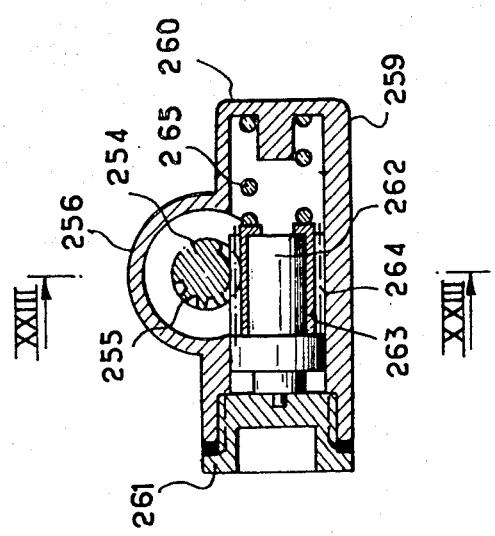

HEAT EXCHANGER, IN PARTICULAR FOR A COOLING CIRCUIT OF A MOTOR VEHICLE ENGINE

FIELD OF THE INVENTION

The invention relates to a heat exchanger, particularly for a cooling circuit of a motor vehicle engine.

BACKGROUND OF THE INVENTION

Heat exchangers or radiators are known of the type in which are provided two circuits for the passage of a liquid to be cooled, said circuits being controlled by a valve sensitive to the liquid temperature, so that when the engine cooling liquid temperature is low (for example when starting after a prolonged stop), the valve controls the opening of one of the circuits through which the liquid returns directly to the engine without passing through the exchanger or flows only through a small portion of the exchanger, so that the increase of temperature of the engine is quick and, when the engine is hot, the valve controls the passage of the liquid in the other circuit, in order to have it flow in the exchanger so as to cool it down.

In such known devices, the valve is either exterior the exchanger, thereby involving special connections with the engine cooling circuit, or integrated to a radiator water box and is then out of access unless the water box is completely disassembled. The construction, the mounting and the connection of the radiator is therefore complex and its cost price is increased.

OBJECTS AND SUMMARY OF THE INVENTION

The object of the invention is a heat exchanger, particularly a radiator which is part of a cooling circuit of a motor vehicle engine, which is not exhibiting such disadvantages.

The invention provides a heat exchanger comprising a nest of tubes opening into a water box provided with at least one of the liquid inlet and outlet pipes, first and second liquid circuits formed in parallel in the exchanger, and a valve sensitive to the temperature for controlling the flow of the liquid through said circuits, said valve being housed in the water box the inner space of which is divided into two chambers, the first circuit being formed by the first chamber and at least a portion of the tubes of the nest, the second circuit being formed by the second chamber and possibly the other tubes of the nest, characterized in that passages are formed between the second chamber, the first chamber and the liquid inlet or outlet pipe, and are adapted to be closed and opened selectively by a single sealing member on which act, on the one hand, said valve in one direction, and, on the other hand, a return resilient member in the opposite direction.

This arrangement according to the invention provides an easier manufacture, mounting and assembly of the radiator, and reduces its cost price.

According to a further characteristic of the invention, the valve is carried by an inner casing defining said chambers in the water box and which is removably installed in the water box, in which case it is positioned by inner protrusions of the water box and secured in position when the latter is mounted on the body of the exchanger, or formed integrally with the water box, in which case the valve is accessible in the casing from an access opening formed in the water box.

According to the invention, it is therefore sufficient to provide in the water box carrying the inlet and/or outlet pipe an inner casing for defining in the exchanger the two parallel circuits in one and/or the other of which flows a liquid as a function of its temperature as detected by said valve. No other modification is necessary for passing from a standard exchanger or radiator to an exchanger according to the invention, and the mounting and connection of the radiator are carried out in the usual way.

BRIEF DESCRIPTION OF THE DRAWINGS

In the following description which is given by way of example, reference is made to accompanying drawings wherein:

FIG. 1 is a perspective schematic view of an exchanger to which the invention is applicable, FIG. 2 is a cross-sectional view of a water box, comprising the inlet and outlet pipes of the exchanger of FIG. 1, FIG. 5 is a sectional view along line V—V of FIG. 2, FIG. 6 is a view similar to FIG. 5, but showing the valve in another condition, FIG. 7 is a schematic view of another exchanger to which the invention is applicable, FIG. 8 is a sectional view of a portion of the water box, carrying the inlet or outlet pipe of the exchanger of FIG. 7, FIG. 9 is a sectional view along line IX—IX of FIG. 8, FIG. 10 is a sectional view along line X—X of FIG. 8, FIG. 11 is a view similar to FIG. 10, but showing the valve in another condition, FIG. 19 is a sectional view of a portion of a water box, according to a further embodiment of the invention, FIGS. 20 and 21 are respective sectional views along lines XX—XX and XXI—XXI of FIG. 19, FIG. 22 is a perspective view of the valve of FIG. 19, FIG. 23 is a view of a portion of the water box of still another embodiment of the invention, seen in cross-section along line XXIII—XXIII of FIG. 24, and FIG. 24 is a sectional view along line XXIV—XXIV of FIG. 23.

DETAILED DESCRIPTION OF THE EMBODIMENTS

Figure 4:
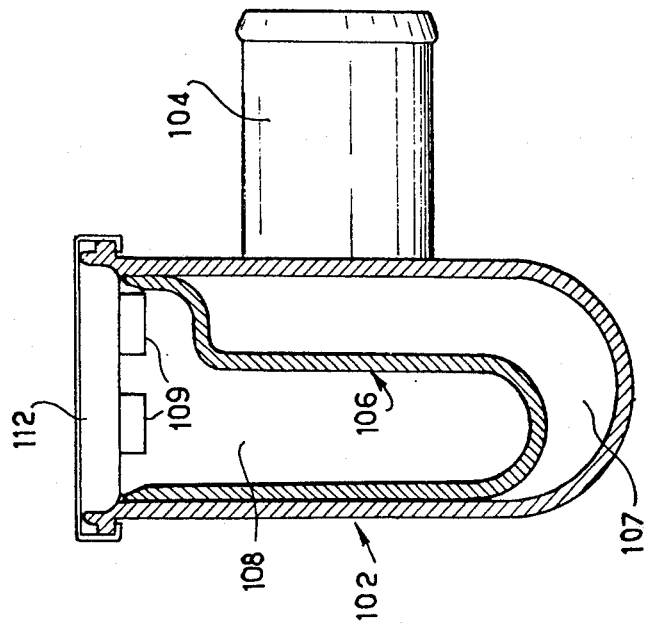
FIG. 4 is a sectional view along line IV—IV of FIG. 3.
Figure 3:
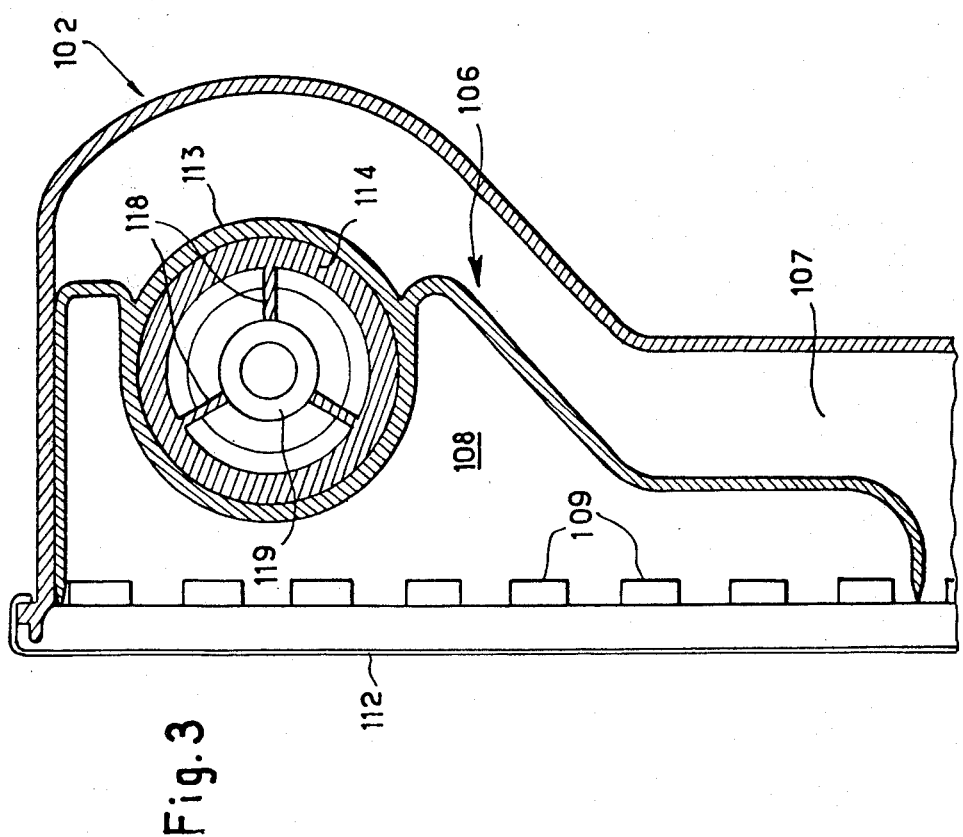
FIG. 3 is a sectional schematic view along line III—III of FIG. 2.

Reference is first made to FIGS. 1 to 6 relating to a first embodiment of the invention.

In this embodiment, the heat exchanger is a radiator comprising a body 101, a first water box 102 comprising the inlet pipe 103 and the outlet pipe 104 of the exchanger, and a second water box 105. The body 101 of the exchanger comprises two parallel rows of horizontal tubes connecting the water boxes 102 and 105.

Inside the water box 102 is placed an inner casing 106 defining two chambers 107 and 108, the chamber 107 being outside the inner casing 106 while chamber 108 is formed by the inner space of said casing. A portion of the tubes of body 101 of the exchanger open into the inner chamber 108, as shown at 109, while the rest of said tubes open into chamber 107, as shown at 110. The casing 106 is simply positioned inside the water box 102, by means of inner protrusions 111 depending from the water box wall, and is secured against movement when the water box 102 is fixed on the hollowed plate 112 carrying the ends 109 and 110 of the tubes of the exchanger body.

The inner casing 106 is provided with a cylindrical bearing member 113 in axial alignment with the inlet pipe 103 and spaced apart from the latter by a predetermined distance. A tubular cylindrical valve 114 is slidably mounted into said cylindrical bearing member 113, and is subjected to the action of a return spring 115 resting at one end against a longitudinal wall 116 of the water box 102 around the mouth of the inlet pipe 103, and by its outer end on a shoulder of the cylindrical skirt of valve 114. The spring 115 tends to bias back the valve 114 so that it rests against the longitudinal wall 117 of the inner casing 106 opposite the longitudinal wall 116 of the water box 102. The cylindrical bearing member 113 does not extend over the whole length of the inner casing 106 and ends at some distance from the longitudinal wall 116 of the water box 102 and from the opposite wall 117 of casing 106.

From the cylindrical skirt of valve 114 depend radial arms 118 supporting an axial inner sleeve 119 inside which is slidably mounted the cylindrical body of a capsule 120 forming a valve sensitive to the temperature, of the type comprising an agent exhibiting a high thermal expansion coefficient, such as wax, acting on a piston. On the opposite side of the inlet pipe 103, the body of the capsule 120 is formed with a shoulder 121 on which rests a compression spring 122 interposed between said shoulder 121 and the axial sleeve 119. The piston rod 123 of capsule 120 ends into a plate 124 applied on the longitudinal wall 117 of the inner casing 106.

The device operates in the following manner:

The liquid flows into the water box 102 via the inlet pipe 103 and flows through the tubular cylindrical valve 114 so as to constantly steep capsule 120, whatever the position of said valve in the cylindrical bearing member 113. When the liquid temperature is low, the piston rod 123 is retracted inside the body of capsule 120, and the valve 114 is pushed by spring 115 in the position shown in FIGS. 2 and 5. In this position, the cylindrical skirt of the valve 114 is applied at its end on the wall 117 of the inner casing 106 while being guided by the cylindrical bearing member 113, so that the chamber 108 defined by the inner space of casing 106 is separated or isolated from the inlet pipe 103 and from chamber 107. The liquid brought by the inlet pipe 103 flows then into chamber 107 and reaches directly the outlet pipe 104 without flowing through the exchanger.

On the contrary, when the liquid temperature increases, the piston rod 123 of capsule 120 extends outside the body of said capsule and displaces the valve 114 in the direction of the longitudinal wall 116 of the water box 102, viz. towards the inlet pipe 103, against the action of the return spring 115. At the end of its stroke, the valve 114 assumes the position shown in FIG. 6, where its cylindrical skirt, applied against the wall 116 around the mouth of the inlet pipe 103, separates the latter from chamber 107 of the water box 102, in a substantially sealing manner. The liquid brought by the inlet pipe 103 flows then only through the valve 114 into chamber 108, flows through the tubes the ends 109 of which open into chamber 108, reaches the second water box 105 and flows back into chamber 107 of the first water box 102 by flowing through the tubes the ends 110 of which open into said chamber 107. From chamber 107, the liquid flows through the outlet pipe 104. It is understandable that the tubes opening into chamber 107 and those opening into chamber 108 are preferably equal in number.

If the liquid temperature goes on increasing when the cylindrical skirt of valve 114 is already applied via its end against the wall 116 of water box 102, the cylindrical body of capsule 120 slides inside sleeve 119 of valve 114, its shoulder 121 compressing spring 122.

FIGS. 7 and 11 show an alternative of this embodiment, applied to a heat exchanger forming an "I" type radiator. The exchanger of FIG. 7 comprises a body 131 connected by two rows of parallel tubes to two water boxes 131 and 133, the first of which comprises the inlet pipe 134 of the exchanger and the second comprises the outlet pipe 135 of said exchanger. An inner casing 136 is positioned inside the water box 132, at the level of the opening of the inlet pipe 134. Said inner casing 136 defines inside the water box 132 two distinct chambers 137 and 138, chamber 137 being formed by the inner space of casing 136, while chamber 138 is outer said casing. In the chamber 137 open only a limited number of tubes 139 of the exchanger, four in the example shown, while all the other tubes 140 open into chamber 138.

As in the previous embodiment, the casing 136 comprises a cylindrical bearing member 141 in axial alignment with the inlet pipe 134. This cylindrical bearing member ends at a short distance from wall 142 of casing 146 which is applied against the wall of the water box 132 carrying the inlet pipe 134, an opening 143 being formed in said wall 142 for providing a communication between the inlet pipe 134 and chamber 137. On the other side, the cylindrical bearing member 141 ends also at a small distance from wall 144 of water box 132, opposite the wall carrying the inlet pipe 134.

A tubular cylindrical valve 145 is slidably mounted in the cylindrical bearing member 141 and is subjected to the action of a return spring 146 interposed between a wall of casing 136 from which depends a cylindrical bearing member 141, and an outer edge 147 of the end of valve 145 adapted for coming to bear against wall 144 of the water box 132.

From the cylindrical skirt of casing 145 depend radial arms 148 forming inside the skirt a hollowed cylindrical collar 149 in which is placed the cylindrical body of a capsule 150, of same type as previously. The cylindrical body of said capsule is formed with a shoulder 151, on the side of wall 144 of the water box 132, bearing against the collar 149. The piston rod 152 of capsule 150 is bearing against wall 144 of the water box via a plate 153.

The cylindrical skirt of valve 145 is formed, in the vicinity of its end turned towards the inlet pipe 134, with a series of radial holes 154 which are masked by the cylindrical bearing member 141 when the valve is in the position of FIGS. 8 and 10, and are not masked when the valve is in the position of FIG. 11.

This device operates in the following manner:

The capsule 150 is constantly steeped by the liquid brought into the water box 132 by the inlet pipe 134. When the liquid temperature is low, the piston rod 152 is retracted inside the capsule, and the spring 146 biases the valve 145 so as to rest against wall 144 of the water box 132. In this position, the cylindrical skirt of valve 145 separates in a substantially tight manner the chamber 138 from the inlet pipe 134. On the contrary, the access to chamber 137 is free, and the liquid flows then into chamber 137, through the four tubes 139, reaches the second water box 133 and flows out of the latter via pipe 135.

When the liquid temperature increases, the piston rod 152 extends outside the body of capsule 150, and the shoulder 151 of said capsule, bearing against the cylindrical collar 149, displaces the tubular valve 145 in the direction of the inlet pipe 134, against the action of the return spring 146, until the valve reaches the position of FIG. 11. In this position, the liquid brought by the inlet pipe 134 flows inside the valve around capsule 150 and flows on the one hand into chamber 138 by passing through the annular space formed between the edge 147 of the valve and the wall 144 of the water box 132, and, on the other hand, in the chamber 137 by passing through the holes 154 of the cylindrical skirt of the valve. In this manner, when the liquid temperature is high, said liquid flows at the same time through the tubes 139 and through the tubes 140 of the exchanger.

In the position of FIG. 11, the valve 145 is still distant from wall 142 of casing 136 or from the corresponding wall of the water box 132, and the spring 146 is not completely compressed. Thus, when the liquid temperature goes on increasing, the valve 145 moves then slightly in the direction of the inlet pipe 134, in spite of the resisting force of spring 146.

In the embodiments just described, the inner casing carrying the capsule or valve sensitive to heat is removably mounted inside the water box, by being simply positioned in the latter, and secured against movement when the water box is mounted on the corresponding hollowed plate of the exchanger or radiator.

In the following embodiments, which will be described with reference to FIGS. 12 to 24, said inner casing is integral with the water box, viz, made in one piece with the latter, for example by molding.

Figure 13:
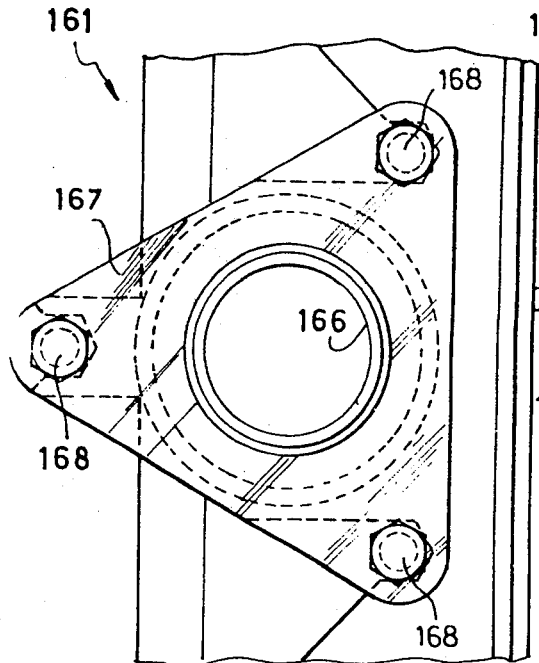
FIG. 13 is a right-hand side view of FIG. 12.
Figure 12:
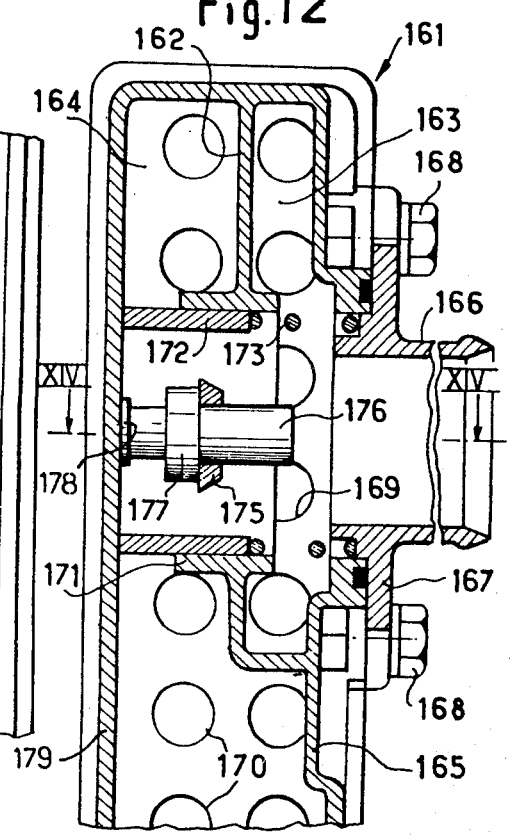
FIG. 12 is a view similar to FIG. 8, but showing another embodiment of the invention.
Figure 14:
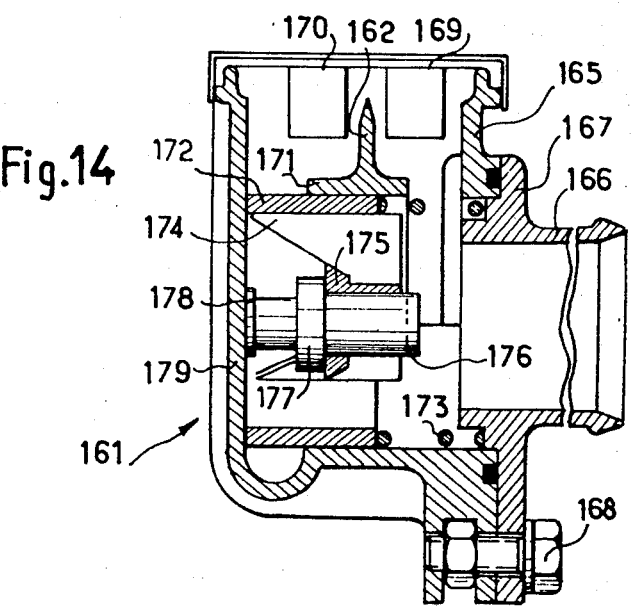
FIG. 14 is a sectional view along line XIV—XIV of FIG. 12.
Figure 16:
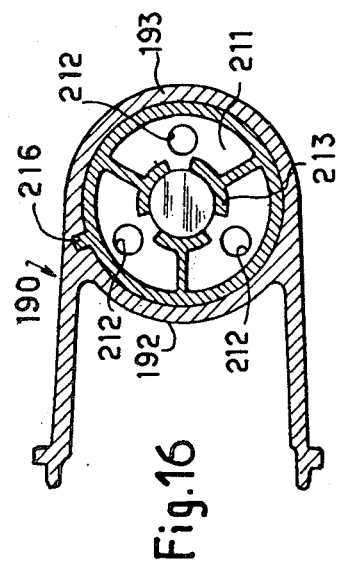
FIGS. 16, 17 and 18 are respective sectional views along lines XVI—XVI, XVII—XVII and XVIII—XVIII of FIG. 15.
Figure 17:
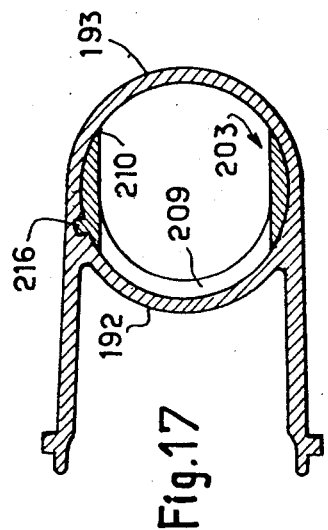
Figure 18:
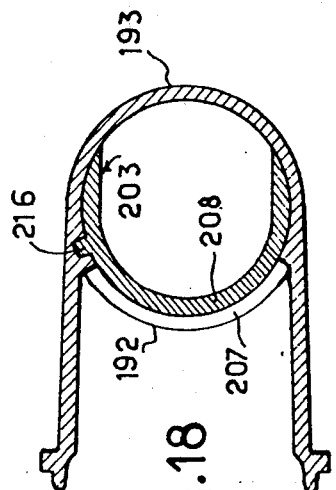
Figure 15:
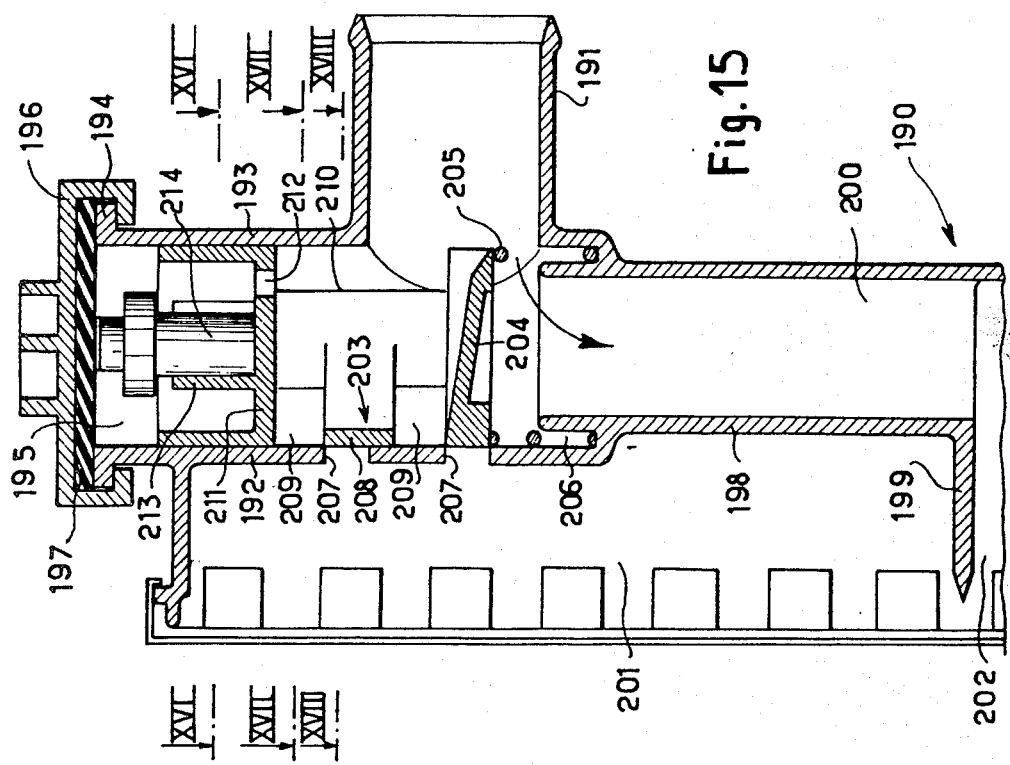
FIG. 15 is a sectional view of a water box, according to still another embodiment of the invention.

In the embodiment described with reference to FIGS. 12 to 14, the water box 161 of the exchanger or radiator is formed with an inner wall 162 defined inside the water box 161 two chambers 163 and 164. Chamber 163 communicates with the inside of the water box through an opening formed in the longitudinal wall 165 of the water box, and the inlet pipe 166 of the exchanger is connected onto the edges of said opening, and is formed to this effect with a triangular flange 167 comprising through-going holes for bolts 168 ensuring the fixation of the pipe on lugs depending from the water box walls 165.

Only a few tubes 169 (five in number in the example shown) of the exchanger body open into chamber 163, while the other tubes 170 open into chamber 164.

From the inner wall 162 of the water box depends a cylindrical bearing member 171, in axial alignment with the inlet pipe 166, and ending at some distance from the opposite longitudinal walls of the water box 161. In said cylindrical bearing member 171 is slightly mounted a tubular valve 172 which is subjected to the action of a return spring 173 interposed between the flange 167 of the inlet pipe 166 and the corresponding end of the tubular valve 172. From the cylindrical skirt of valve 172 depend radial arms 174 supporting an axial inner collar 175 in which is slidably mounted the cylindrical body of the capsule 176 of same type as previously. The body of said capsule is formed with a shoulder 177 resting on the collar 175 while the piston rod of capsule 176 is applied via a small plate 178 against wall 179 of the water box opposite wall 165 carrying the inlet pipe 166.

The operation of the device according to this embodiment is identical to that of the previous embodiment described with reference to FIGS. 7 to 11.

The embodiment described with reference to FIGS. 15 to 18 applies to an "I" or "U" type exchanger, a first water box 190 of which comprises the inlet pipe 191 of the exchanger, the outlet pipe being carried either by the other water box, not shown, or by the same water box 190. The water box 190 is formed, by molding, with an inner wall 192 forming, with the wall 193 carrying the inlet pipe 191, a cylindrical bearing member extending perpendicularly to the axis of the inlet pipe 191, and into which opens said inlet pipe. One end of the cylindrical bearing member thus formed opens outside the water box 190, via an access opening 195 normally closed by a plug 196, of the bayonet type and resting on the lower face of an annular edge 194 which is ending the outer portion of said cylindrical bearing member. A sealing joint 197 formed by a rubber washer for example is interposed between the annular edge 194 and the bottom of plug 196.

At its opposite end, said cylindrical bearing member extends into a wall 198 forming a channel 200 opening at one end inside of the cylindrical bearing member, adjacent the inlet pipe 191, and opening at its opposite end inside the water box. The wall 198 ends into a perpendicular edge 199, oriented towards the hollowed plate on which the water box 192 will be mounted, so that said edge defines inside the water box two chambers 201 and 202: the first being outside the cylindrical bearing member and channel 200, and the second being situated at the issue of channel 200. In the case of an "I" type circulation, the larger number of the exchanger tubes open into chamber 201, while a small number of the tubes open into chamber 202.

In the case of a circulation of the "U" type, the same number of tubes open into each chamber.

In said cylindrical bearing member defined by the walls 192 and 193 of the water box is slidably mounted a tubular cylindrical valve 203, which is introduced inside said cylindrical bearing member through the access opening 195. The valve 203 ends at its lower portion as a closed bottom 204 on which bears an end of a compression spring 205 the other end of which bears against the bottom of an annular groove 206 formed around the end of channel 200 and opening towards the inlet pipe 191. The spring 205 tends to bias the valve 203 back towards the plug 196.

The inner wall 192 is formed with two cut-outs or openings 207 for establishing a communication between chamber 201 and the inside of the cylindrical bearing member. Likewise, the cylindrical skirt 208 of valve 203 is also formed with two openings or cut-outs 209 adapted for being brought in register with the cut-outs or openings 207 of wall 192. Said cut-outs 207, 209 extend over about a quarter of a circle. The valve skirt 208 is also formed with an opening, diametrically opposite the cut-outs or openings 209, said opening being for example formed by a wide slot 210 extending from the valve bottom 204 over a certain height, to the level of a transverse wall 211 of the valve, formed with apertures 212 and from which depends a hollowed collar 213 adapted for receiving the cylindrical body of a capsule 214 of the same type as previously. The piston rod of said capsule 214 bears against the rubber washer 197 of plug 196, while the bottom of the body of said capsule bears against the transverse wall 211 of the valve. The valve skirt 208 is formed with a longitudinal rib 216, housed in a groove of the cylindrical bearing member, for securing the valve against rotation.

This device operates in the following manner:

The liquid brought by the inlet pipe 191 flows into the cylindrical bearing member and inside the valve 203, then through the apertures 212 above wall 211 in order to steep capsule 214. When the liquid temperature is low, the capsule piston rod is retracted inside the capsule body and the valve 203 occupies the position shown in FIG. 15, wherein the openings 207 of the inner wall 192 are closed by the valve cylindrical skirt 208. The chamber 201 is thus isolated from the inlet pipe 191. In the case of an "I" type circulation, the liquid brought by the inlet pipe flows then through channel 200 and into chamber 202, then through the tubes opening into said chamber, reaches the second water box (not shown), then the outlet pipe of the exchanger.

In the case of a "U" type circulation, the liquid flows from channel 200 to chamber 202 and exits by the outlet pipe (not shown) opening into said chamber.

When the liquid temperature goes up, the piston rod of capsule 214 extends outside the cylindrical body of said capsule so that the valve 203 is pushed back downwardly against the action of the return spring 205. The openings 209 of the valve cylindrical skirt 208 are progressively brought in register with the openings 207 of the inner wall 192, and the liquid brought by the inlet pipe 191 can flow into chamber 201 and through the tubes opening into said chamber before reaching the outlet of the exchanger. Since in an "I" type circuit, the valve bottom 204 is not applied against the opening of channel 200, the liquid can also flow through channel 200 and through the other tubes of the exchanger which open into chamber 202.

For an "U" type circuit, the bottom 204 is applied against the opening of channel 200.

One shall remark that the rubber washer 197 forms a sealing joint for the mounting of plug 196, and allows also absorbing part of the expansions of capsule 194 resulting from a greater increase of the temperature while the spring 205 is already compressed to the maximum or when the bottom 204 is bearing against the opening of channel 200.

FIGS. 19 to 22 show an alternative embodiment, different to that just described. In this alternative embodiment, the water box 220 is formed, opposite the opening of the inlet pipe 220 of the exchanger, with an inner wall 222 forming a cylindrical bearing member extending perpendicularly to the axis of the inlet pipe 221 and perpendicularly to the hollowed plate 223 carrying the ends of the liquid circulation tubes inside the exchanger body. In the preceding embodiment described in FIGS. 15 to 18, the cylindrical bearing member was extending parallel to the hollowed plate.

Above the upper end of the inner wall 222, the water box 220 is formed with an annular edge 224 defining an access opening to the inside of the water box and the cylindrical bearing member formed by wall 222, and allows mounting a bayonet plug 225, with interposition of a sealing joint 226.

A tubular cylindrical valve 227, shown in perspective in FIG. 22, is introduced through this access opening inside the cylindrical bearing member, where it is slidably mounted, being subjected to the action of a return spring 228 one end of which is bearing against the closed bottom 229 of the valve and the other end of which is bearing against an inner annular protrusion 230 of wall 222, on the side of the hollowed plate 223. The cylindrical skirt of the valve 227 is formed with an outer longitudinal rib 231 nesting into a corresponding groove 232 of the inner face of wall 222 and provided for immobilizing the rotation valve.

The cylindrical skirt of valve 227 is formed, in the vicinity of bottom 229, with a substantially semi-circular opening 233 in register with the opening of the inlet pipe 221. The inner wall 222 is formed, at its upper portion, with two diametrically opposite openings 234 extending each over a quarter of a circle about, and which are closed by the cylindrical skirt of valve 227 when the latter is in the position of FIG. 19.

The valve 227 comprises also a cylindrical axial sleeve 235 inside the valve cylindrical skirt, and depending from the bottom 229 of said valve. Said sleeve 235 houses the cylindrical body of a capsule 236, of same type as previously, the end of the piston rod of which bears against the bottom of plug 225.

The inner wall 222 defines, inside the water box 220, two chambers 237 and 238, one being inside wall 222, and the other being outside said wall. Into chamber 237 open only, at 239, a few tubes of the heat exchanger, four in the example shown, while the other tubes open at 240 into chamber 238.

The device operates in the following manner:

The liquid flowing into the water box 220 via the inlet pipe 221 flows through the opening 233 inside valve 227 whatever the position of the latter, and steeps constantly capsule 236. When the liquid temperature is low, the piston rod is retracted inside the capsule body, and the valve 227 is in the position shown in FIG. 19 in which the annular end of the valve cylindrical skirt bears against an inner edge of plug 225. The openings 234 of the inner wall 222 are closed by the valve cylindrical skirt, so that the liquid brought by the inlet pipe 221 can flow only into chamber 237 and through the four tubes opening at 239 into said chamber. Through said tubes, the liquid reaches the second water box (not shown) of the exchanger, which comprises the exchanger outlet pipe.

When the liquid temperature goes up, the capsule piston rod extends outside the cylindrical body of said capsule and pushes, via the capsule cylindrical body, the valve 227 towards the annular protrusion 230 of wall 222, against the action of the return spring 228. During this movement, the valve cylindrical skirt progressively unmasks the openings 234 of the inner wall 222 and allows the liquid to flow into chamber 238. Advantageously, the stroke of valve 227 is such that whatever the temperature of the liquid, it never comes in abutment against the annular protrusion 230. Therefore, the liquid can flow into the two chambers 237 and 238 and can circulate through all the tubes of the exchanger body as soon as the temperature of the liquid has reached a predetermined minimum value.

The embodiment shown in FIGS. 23 and 24 relates not to a tubular valve which is axially displaced in transition inside a cylindrical bearing member, but to a tubular valve which is rotatably displaced around its axis inside a cylindrical bearing member. The water box 250, in which is mounted said valve, comprises an inlet pipe 251 of the exchanger, the inner cylindrical surface of which is axially extended, inside the water box, by an inner wall 252 forming a cylindrical bearing member in which is housed the tubular cylindrical valve 253, introduced via the inlet pipe 251. Said valve ends into a cylindrical stem 254, a portion of the peripheral surface of which is formed with a toothing 255. This cylindrical stem is housed inside a cylindrical boss 256 of the water box wall 257, opposite wall 258 carrying the inlet pipe 251. The water box wall 257 forms also another cylindrical housing 259, perpendicular to the first and fitting into it, and being formed with a closed end 260 and an opposite opened end which is removably closed by a screwed plug 261.

In the second cylindrical housing 259 is housed a capsule 262, of same type as previously, the piston rod of which bears against the bottom of plug 261. The cylindrical body of capsule 262 is rigidly connected to an outer sleeve 263, surrounding said cylindrical body and provided with an outer toothing 264. Said outer toothing 264 meshes with the toothing 255 of the cylindrical stem 254 of the tubular valve 253.

The capsule 262 is subjected to the action of a return spring 265 interposed between the bottom 260 of the cylindrical housing 259 and the corresponding end of sleeve 263.

The water box 250 comprises another inner wall 266, 267, extending from wall 252 which forms the cylindrical bearing member of valve 253 and is connected to wall 258 of the water box carrying the inlet pipe 251. Said inner wall 266, 267 defines two chambers 268, 269 inside the water box, the first being formed between the inner wall 266, 267 and the wall 252 of the water box, the other being outside. Into chamber 268 emerge only, at 270, a few tubes of the exchanger body (four in the example shown) while the other tubes emerge at 271 into chamber 269. The cylindrical skirt of valve 253 is formed with openings 272 at the level of chamber 268 and with other openings 273 on the level with the other chamber 269. The first openings 272 extend over about 120° and the other openings 273 are angularly displaced relative to the first.

The bottom of wall 252 which forms the cylindrical bearing member of the valve comprises an opening in register with the openings 270 and 271 of the tubes of the exchanger body.

This device operates in the following manner:

The liquid brought by the inlet pipe 251 flows inside valve 253 and steeps constantly capsule 262. It is with this object in view that the portion of this valve which connects its skirt to the cylindrical stem 254 is formed with openings 275 allowing the liquid to reach capsule 262. When the liquid temperature is low, the capsule piston rod is retracted inside the cylindrical body of said capsule, which occupies the position shown in FIG. 24. To this position corresponds a position of the valve, shown at 23, wherein the openings 272 of the valve cylindrical skirt are in register with the ends of the four tubes opening at 270 into chamber 268. Therefore, the liquid brought by the inlet pipe 251 can flow through said four tubes and reach the second water box (not shown) of the exchanger, which comprises the outlet pipe. On the contrary, the other openings 273 formed in the cylindrical skirt at the level of the second chamber 269 are not in register with the openings 271 of the other tubes of the exchanger, and are masked by the inner wall 252.

When the temperature of the liquid goes up, the capsule piston rod extends outside the body of said capsule and pushes the cylindrical body towards the bottom 260 of the cylindrical housing 259, against the action of the return spring 265. Through its outer toothing 264 which meshes with the toothing 255 of the cylindrical stem of valve 253, the sleeve 263, during this movement, drives in rotation the valve 253 about its axis. The effect of this rotation is to bring the opening 273 of the valve cylindrical skirt in register with the ends of the tubes emerging at 271 into chamber 269 of the water box. The expanse of the openings 271 however is such that they are always in communication with the tubes emerging at 270 into chamber 268. Under such conditions, the liquid brought by the inlet pipe 251 flows at the same time through the tubes emerging into chamber 268 and through those emerging into chamber 269.

The stroke of the cylindrical body of capsule 262 inside its housing 259 is such that it cannot come in contact with the bottom of said housing, which allows avoiding any risk of damage to said capsule.

In all the embodiments described and shown, the disposition of an inner casing in the first water box of a heat exchanger such as a radiator, said casing being indifferently fixed inside the water box or made integral with the latter, allows defining two parallel circuits in the exchanger, the liquid flowing only in one circuit when its temperature is low, and flowing either in the other circuit, or in parallel in both circuits, according to whether the exchanger is of the "U" or "I" type, when its temperature goes up from a predetermined minimum value. The invention allows also accelerating the heating up of the engine of a motor vehicle, when started when cold, due to a simple and little costly modification of a water box of the exchanger, and without it being necessary to modify the connection of the exchanger with the cooling circuit of said engine.

In all the embodiments described hereabove, and for making the description simpler, the thermostatic device has been voluntarily shown in the vicinity of the liquid inlet pipe and for circuits of the "I" or "U" type; but it is obvious that for each type, the thermostatic device can be placed opposite the outlet pipe, and that the type of circulation can vary under the proviso of possible slight modifications, without these embodiments departing from the scope of the invention.

One can also replace the hereabove described thermostatic capsule by any other actuator element controlled by the temperature of the cooling liquid without departing from the scope of the invention (for example by using a sensitive element with a mnemomorphous spring).

I claim:

1. A heat exchanger, particularly for a cooling circuit of a motor vehicle engine, comprising a water box provided with at least a liquid inlet pipe; a nest of tubes opening into the water box; first and second chambers formed inside the water box; first and second liquid circuits formed in parallel in the exchanger, the first circuit comprising said first chamber and at least a portion of said tubes, the second circuit comprising at least said second chamber; passages formed between said liquid inlet pipe, said first chamber and said second chamber and comprising a tubular cylindrical wall forming a bearing open at both ends thereof and extending between said chambers; a valve sensitive to the liquid temperature for controlling the flow of the liquid through said passages and said circuits, a cylindrical valve member guided in said bearing and biased in one direction by said temperature sensitive valve; a return spring for biasing said cylindrical valve member in a direction opposite to said one direction; said temperature sensitive valve, said valve member and said bearing being in axial alignment with said liquid inlet pipe inside said water box, said valve member having an axial inner sleeve and a cylindrical skirt open at both ends thereof and guided in said bearing, said temperature sensitive valve having a body received in said sleeve and a piston applied on a wall of said water box opposite to said liquid inlet pipe, said return spring being provided between said valve member and a wall of said water box.

2. An exchanger according to claim 1, comprising an inner casing housed in said water box and defining therein the said chambers and the said bearing, said casing being removably mounted within said water box and being positioned therein by inner protrusions of said water box.

3. An exchanger according to claim 1, wherein the said chambers and the said bearing are formed inside the water box by inner walls made integrally with said water box, said temperature sensitive valve and said valve member being accessible from an access opening formed in the water box.

4. An exchanger according to claim 3, wherein said access opening is closed by a removable plug.

5. An exchanger according to claim 4, wherein said liquid inlet pipe is provided on said plug.

6. An exchanger according to claim 1, wherein said cylindrical wall forming said bearing is provided with access apertures to said chambers, said apertures being respectively closed and opened by said skirt of said valve member.

7. An exchanger according to claim 6, wherein the first and second circuits each comprise tubes of the exchanger, and wherein the skirt of said valve member is formed with apertures which are brought in register with some apertures of said bearing opening into said second chamber when the valve member is in a position closing a said passage to said second chamber and opening another said passage to said first chamber so that the liquid can flow in parallel through said first and second circuits.

8. An exchanger according to claim 1, wherein the body of said temperature sensitive valve received in said axial sleeve of the valve member comprises an annular shoulder, and a compression spring surrounding said body is interposed between said shoulder and said sleeve.

* * * * *